United States Patent
Nishizawa

[11] Patent Number: 5,822,284
[45] Date of Patent: *Oct. 13, 1998

[54] AUDIO PLAYER WHICH ALLOWS WRITTEN DATA TO BE EASILY SEARCHED AND ACCESSED

[75] Inventor: Tatsuo Nishizawa, Ueda, Japan

[73] Assignee: Shinano Kenshi Kabushiki Kaisha, Nagano-Ken, Japan

[*] Notice: The term of this patent shall not extend beyond the expiration date of Pat. No. 5,687,144.

[21] Appl. No.: 706,709

[22] Filed: Sep. 6, 1996

[30] Foreign Application Priority Data

Sep. 6, 1995 [JP] Japan .................... 7-228933

[51] Int. Cl.$^6$ .................... G11B 17/22
[52] U.S. Cl. .................... 369/32; 369/47
[58] Field of Search .................... 369/32, 33, 54, 369/58, 47, 48, 124, 2, 30, 53; 360/72.2

[56] References Cited

U.S. PATENT DOCUMENTS

| | | | |
|---|---|---|---|
| 5,150,339 | 9/1992 | Ueda et al. | 369/32 |
| 5,164,865 | 11/1992 | Shaw | 360/72.2 |
| 5,388,093 | 2/1995 | Yoshida et al. | 369/124 |
| 5,544,130 | 8/1996 | MIzuno et al. | 369/2 X |
| 5,687,144 | 11/1997 | Nishizawa | 369/33 |

FOREIGN PATENT DOCUMENTS

| | | |
|---|---|---|
| 0376756 | 7/1990 | European Pat. Off. . |
| 0378449 | 7/1990 | European Pat. Off. . |
| 0606157 | 7/1994 | European Pat. Off. . |
| 0634746 | 1/1995 | European Pat. Off. . |
| 3103890A | 4/1991 | Japan . |
| 3144762 | 6/1991 | Japan . |
| 415872A | 1/1992 | Japan . |
| 432960A | 2/1992 | Japan . |
| 467490A | 3/1992 | Japan . |
| 4280376A | 10/1992 | Japan . |
| 511965A | 1/1993 | Japan . |
| 5233699A | 9/1993 | Japan . |
| 683874A | 3/1994 | Japan . |
| 07121546A | 5/1995 | Japan . |
| 07129619A | 5/1995 | Japan . |
| 07129620A | 5/1995 | Japan . |
| 07152787A | 6/1995 | Japan . |

OTHER PUBLICATIONS

Japanese Utility Model Application No. 1–73898, Gazette Publication pp. 241–242, May 18, 1989, Koruga.

Primary Examiner—Paul W. Huber
Attorney, Agent, or Firm—Birch, Stewart, Kolasch & Birch,LLP

[57] ABSTRACT

An audio player is capable of reading written data of introduction parts of groups of sentences written on a recording medium. The audio player includes a reading section for reading written data and a retrieving table. The retrieving table includes data indicating interrelationships between each group of sentences and a reproduction-starting position for each group. An input section allows inputting a command for reading an introduction part of the group of sentences. A memory section is provided for storing the retrieving table. An audio reproducing section converts the written data into audio signals, and a control section oversees the retrieving, reading, and reproducing of the written data.

8 Claims, 2 Drawing Sheets

US 5,822,284

AUDIO PLAYER WHICH ALLOWS WRITTEN DATA TO BE EASILY SEARCHED AND ACCESSED

BACKGROUND OF THE INVENTION

1. Field of the Invention

The present invention relates to an audio player for reproducing stored or writing data recorded on a recording medium, such as a CD-ROM, as audio signals.

2. Description of Background Art

Conventionally, an audio player, which is capable of reproducing stored data as audio signals, is called an "audio book." An "audio book" is used by a blind person for reading. The conventional audio book plays a cassette tape, so stored data are sequentially read by the audio book.

To select and listen to a desired segment of the audio signals, a blind person must listen written on the cassette tape as writing data, the object writing data are retrieved by listening to tone signals, which cannot be heard by our ears when the cassette tape is normally played, but which can be heard when the cassette tape is rapidly forwarded or rewound.

The conventional audio book has the following disadvantages.

The tone signals are heard by rapidly forwarding or rewinding the tape. Therefore, it is difficult to gain access to a desired segment of the stored data. When the tone signals are assigned to large segments of data, such as chapters of a book, the data of the smaller units which make up a chapter, such as a paragraph or a section of the book, cannot be selected by checking the tone signals. Also, it is difficult for beginners to use the conventional audio book.

These days, many electric or electronic appliances are used in houses, so it is necessary for blind persons to read the operating manuals of the appliances and special books. Unlike literary books, the operating manuals and the special books are not read from the beginning. We usually read only the necessary parts of the operating manual, so an audio player which is capable of correctly and rapidly selecting only the desired stored data is desired.

Conventional audio books may allow stored data to be accessed by using a tape counter, however it is still difficult to precisely search for beginnings of groups of sentences or other desired sections of data.

SUMMARY OF THE INVENTION

An object of the present invention is to provide an audio player, which is capable of reading stored data in the form of introductions to groups of sentences. The data are stored on a recording medium, such as a CD-ROM. The audio player reproduces said data as audio signals or a voice.

To achieve the object, the audio player of the present invention has the following structures.

Namely, the audio player for reproducing stored data for reading an as audio signals, the stored data being stored on a recording medium, the recording medium also storing a retrieving table, the retrieving table containing contents elements including addresses for particular groups of sentences which are part of the stored data, includes:

a reading section capable of reading said stored data and said retrieving table;

an audio reproducing section capable of converting said stored data into audio signals;

a memory section capable of storing said retrieving table;

an input section capable of accepting a user input command indicating a contents element of said retrieving table; and a control section which accepts the user input command from said input section, determines a selected contents element indicated by the user input command, determines the address of a group of sentences indicated by the selected contents element, directs said reading section to read said group of sentences indicated by the selected contents element from the stored data, and directs said audio reproducing section to convert the stored data contained in said group of sentences indicated by the selected contents element into audio signals.

In the audio player, the stored data may represent text from a book and said contents elements of said retrieving table are arranged in a pyramidal data structure of different levels, said pyramidal data structure including the levels of chapters, paragraphs, and sections.

In the audio player, the content elements may also include sizes of the particular groups of sentences which are part of said stored data, and said reading section retrieves the group of sentences indicated by the selected contents element by reading said stored data beginning at the address associated with the selected contents element and by reading the stored data until the size associated with the selected contents element has been read.

In the audio player, the input section may also be capable of accepting a user input command indicating a retrieval direction; and wherein said control section causes said reading section to sequentially read a group of sentences associated with a next contents element in the retrieving table in the retrieval direction.

With above described structures, the control section controls the reading section to store the retrieving table, which has been written on the recording medium, in the memory section. When the command for reading the introduction parts is inputted by the input section, the groups of sentences are retrieved with reference to the retrieving table in the memory section. If one group is retrieved, the reproduction-starting position of the group is read, then the introduction part of the group, which starts from said reproduction-starting position, is read by the reading section. Successively, the stored data of said introduction part are reproduced as audio signals or voice by the audio reproducing section, so that contents of the retrieved group of sentences can be known by audio signals.

In the present invention, the stored data of books, etc. and the retrieving table are written on the recording medium, e.g., a random accessible CD-ROM. The groups of sentences, which are part of the stored data, can be retrieved by inputting the command for reading the introduction parts. Then the introduction parts of each group of sentences can be reproduced as the audio signals, so that a blind person can understand the relevance of each section of the stored data. Further, a desired group of sentences can be correctly retrieved. A skip mark can be marked to the group of sentences, which will be read again, while after reading the introduction part thereof. Later, the marked group can be selectively and efficiently read and reproduced as the audio signals.

BRIEF DESCRIPTION OF THE DRAWINGS

An embodiment of the present invention will now be described by way of examples and with reference to the accompanying drawings, in which.

DETAILED DESCRIPTION OF THE PREFERRED EMBODIMENT

A preferred embodiment of the present invention will now be described in detail with reference to the accompanying drawings.

Figure 1:
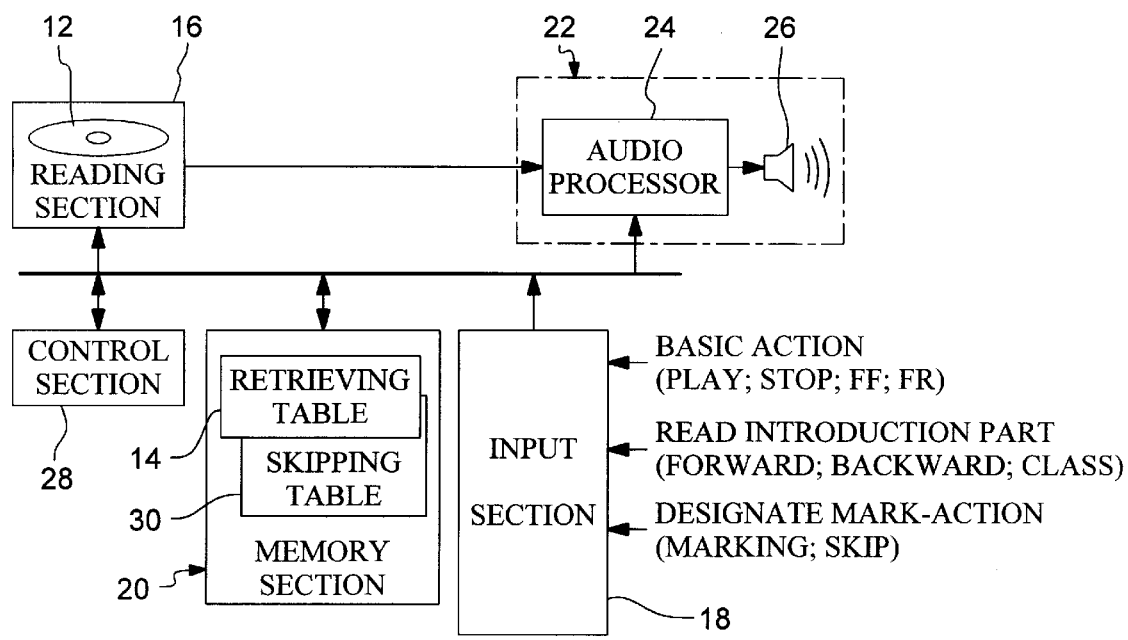
FIG. 1 is a block diagram of an audio player according to the present invention.

A basic structure and operation of the audio player of the present invention will be explained with reference to FIG. 1. Note that, a CD-ROM 12 is used in the audio player. The CD-ROM 12 is a random accessible type of recording medium. Alternatively, other random access types of recording medium may be used, such as a flexible disk or an IC card including a semiconductor element, such as a RAM.

The written data of books and a table of contents 14 related to the written data are stored in the CD-ROM 12. The written data are stored as an audio file. The written data are divided into a plurality of groups of sentences, each ground including a head line sentence, or label. Each group may be retrieved as a unit. The table of contents 14 is formed on the CD-ROM. The table is organized according to the labels. The table 14 indicates an interrelationship between each group of sentences and a starting position, e.g., a position for a starting sector, of each group in the audio file (see FIG. 3).

In the present invention written data of a plurality of books are stored in the CD-ROM 12. The groups, are formed in a multilayered pyramidal data structure. The groups are classified into, for example, chapters, paragraphs and sections, of each book (book 1, book 2, . . . ). The sections of the table of contents are the lowest level groups which may be retrieved. The position of the starting sector of each section is stored in the table and associated with the respective section label. The data of the table of contents shows a structure of the chapters, the paragraphs and the sections for each book. For example, if the data of the table of contents are: chapter=1; paragraph=2; and section=2, the retrieved group (the retrieving unit) is first chapter, second paragraph, second section of the retrieved book.

The audio file includes the written data of the books. The written data are audio data of a voice reading the books. This audio data are stored or recorded in the audio file in the CD-ROM 12. Note that, voice wave signals representing a reading of the books may be coded and recorded on the CD-ROM 12. In this case, an audio reproducing section (described later) would convert the coded signals into audio signals, resembling a voice.

In the table 14, each chapter (chapter 1, chapter 2, . . . ) is the group of sentences which make up a chapter; each paragraph (paragraph 1, paragraph 2, . . . ) is the group of sentences which make up a chapter; and each section (section 1, section 2, . . . ) is the group of sentences which make up a section.

A reading section 16 reads the data on the CD-ROM 12. The reading section 16 has: a motor (not shown) for rotating the CD-ROM 12; an optical pickup (not shown) for reading the data from the CD-ROM 12; a servo control unit (not shown) for controlling the motor and the optical pickup; and electronic circuits, including a signal processing circuit, which convert high frequency signals read by the optical pickup into digital signals. If signals indicating the position of the starting sector are inputted to the servo control unit, the servo control unit causes the optical pickup to read the data beginning at the starting sector.

An input section 18 is capable of displaying the labels of the groups listed in the table of contents, and accepting user commands for designating a group. The input section 18 has: operating keys (not shown) for designating basic operations, (e.g., play, stop, fast forward, rewind, pause); keys for designating a retrieving layer of the multilayered pyramidal structure; retrieving direction keys for designating the retrieving directions; a retrieving key for retrieving and reading the introduction parts; a marking key for marking the skip marks; a skip key for selectively reading (skip-reading) according to the skip marks; and skip direction keys for designating the direction of the skip-reading.

Figure 3:
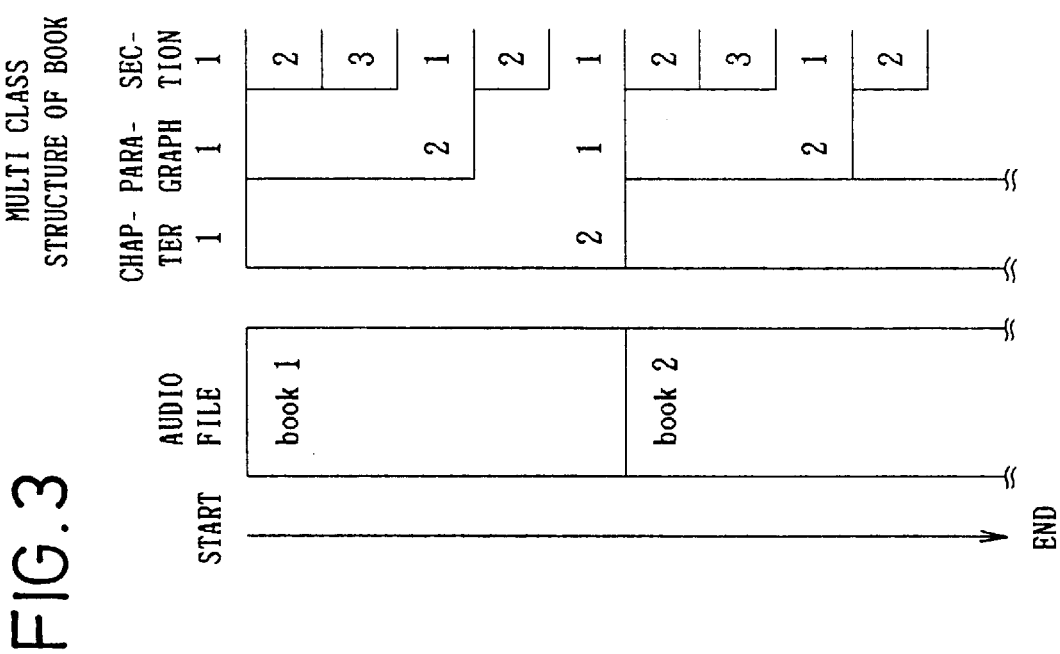
FIG. 3 is representative of a memory table used by the audio player.

As shown in FIG. 3, the data of the table of contents are formed into the multilayered pyramidal structure: chapters; paragraphs; and sections. One of layers or classes can be designated. The designated class can be retrieved group by group (unit by unit). The keys for designating the retrieving class are "↑" key and "↓" key. By pushing the "↑" key, the selected class is changed toward the upper level class or toward the chapters; by pushing the "↓" key, the selected class is changed toward the lower level class or toward the sections.

In the present embodiment, a forward reading key "←" and a backward reading key "→" may be provided instead of the keys for designating the retrieving class and the retrieving key. The forward reading key and the backward reading key are capable of instructing the reading section to retrieve and of designating the retrieving direction. Similarly, a forward skip key and a backward skip key may be provided instead of the skip key and the skip direction key so as to instruct the reading section to selectively read and to designate the skip direction.

A memory section 20 includes semiconductor devices, such as ROMs and RAMs. The memory section 20 stores data, such as the table of contents 14 and control programs for a CPU.

The audio reproducing section 22 includes an audio processor 24 for converting the digital signals of the written data, which are read from the audio file of the CD-ROM 12, into analogue audio signals resembling a voice. The audio reproducing section 22 also includes a speaker 26 for outputting the analog audio signals from the audio processor 24. Note that, if the data in the audio file are compressed, the data are extended to former PCM data. Then, the extended data are D/A converted to the analogue audio signals.

A control section 28 includes the CPU. The control section 28 controls the reading section 16, according to the commands inputted by the input section 18. The CD-ROM 12 of the reading section is controlled to execute basic actions such as play, stop, fast forward, rewind and pause. The CD-ROM can also be directed to read the introduction parts, to mark the skip marks, and to execute the skip reading. When the audio file is read from the CD-ROM 12, the control section 28 controls the audio reproducing section 22 to reproduce the written data in the audio file as the audio signals or voice. When the CD-ROM 12 is inserted into the reading section 16, the control section 28 controls the reading section 16 to read the table of contents 14 from the CD-ROM 12 and to store the table of contents in the memory section 20.

Next, the logical structure of the table of contents 14 will be explained.

As shown in FIG. 3, the table of contents 14 includes the audio files of the books. The audio file includes: the position of the starting sector of each section, which is the retrieving unit of the lowest level in the multilayered pyramidal data structure and which corresponds to each head line written in the table of contents; size of the introduction part (announce message) of each section; the data of the table of contents, which are divided into the chapters, the paragraphs and the sections. Note that, the size of the introduction part may be indicated by number of bytes or a time.

When the introduction part or the announce message is reproduced as the audio signals, the audio reproducing section 22 reproduces the message as a punctuated sentence, rather than a message which stops in the middle of the sentence. Therefore, varying sizes of the announce messages are respectively assigned to each section, which is the lowest retrieving unit. By completely reproducing sentences of the announce message, the user is capable of easily understanding the message and correctly retrieving the object group (retrieving unit). The size of the introduction part varies individually, so the retrieving table 14 includes the size of each punctuated introduction part, stored as the number of bytes or time. Note that, to save the capacity of the memory section 20, the size of the introduction parts of all groups may be the same.

Figure 2:
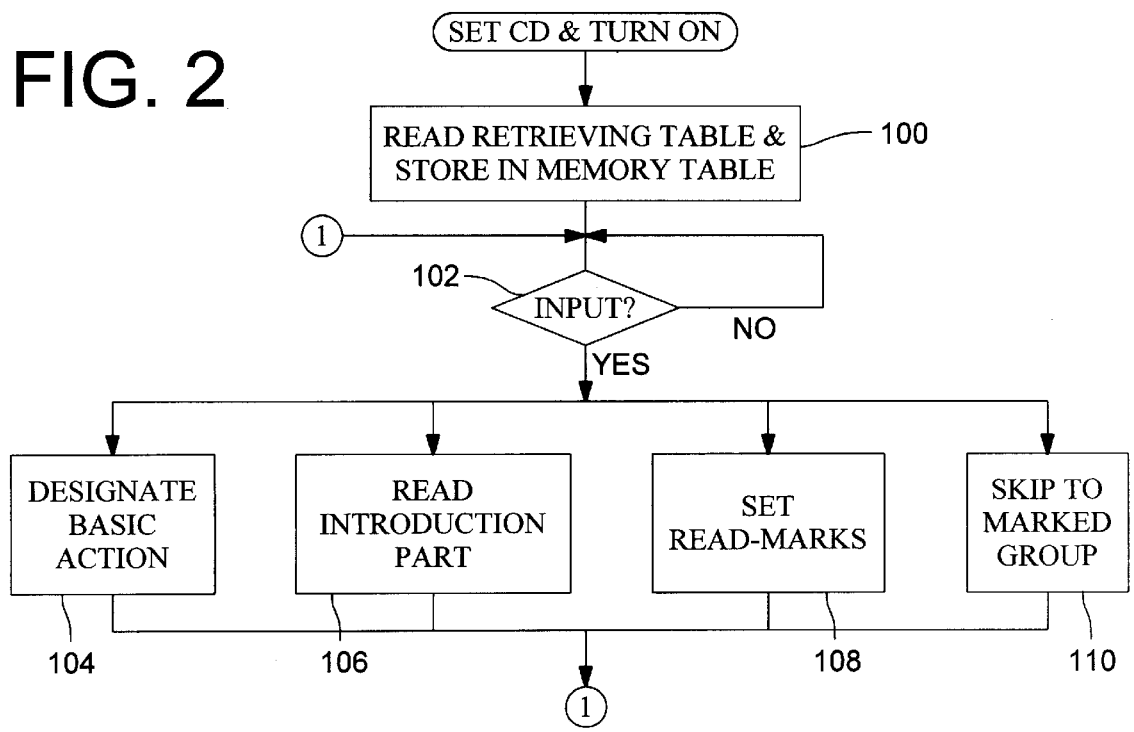
FIG. 2 is a flow chart showing the operation of the audio player.

Next, the action of the audio player 10 will be explained with reference to FIGS. 1–3.

Firstly, the CD-ROM 12 is inserted into the reading section 16 and the player is turned on. The control section 28 controls the reading section 16, according to the control programs stored in the memory section 20. The player is controlled to read the table of contents 14 stored in the CD-ROM 12. Then, the control section 28 stores the table of contents 14 in the memory section 20 (STEP 100). Next, the control section 28 monitors the input section 18 to determine whether or not an input command has been received (STEP 102).

After STEP 102, the control section 28 instructs the player 10 on the basis of the input command received by the input section 18.

If the operating keys are pushed, the control section 28 controls the reading section 16 to execute the basic actions of the player play, fast forward, rewind, stop, or pause (STEP 104). Then the control section 28 returns to STEP 102 to wait for the next command.

If the keys for designating the retrieving class ("↑" key or "↓" key) or the forward and the backward reading keys ("←" key and "→" key) are pushed, the control section 28 begins to retrieve the designated class of the table of contents 14 in the designated direction (forward or backward). Upon retrieving the first group of sentences, the control section 28 reads the position of the starting sector of the group and the size of the announce message thereof. Note that, a standard retrieving position may be a position of the present reading sector in the audio file of the CD-ROM 12 or a beginning sector of the audio file of the CD-ROM 12.

Next, the control section 28 controls the reading section 16 to read the written data (the audio file) of the introduction part of the group, which begins from the starting sector, and reproducing the written data with said message size, as the audio signals, by the audio reproducing section 22. With this action, the introduction part of the first retrieved group can be reproduced as the audio signals, so it is easier for even blind persons to correctly know the contents of the retrieved group.

When the introduction part of the retrieved group is completely reproduced, the control section 28 continues to sequentially retrieve, in the same direction, in the same layer or class so as to continuously read the positions of the retrieved groups and the message size thereof from the retrieving table 14 and reproduce the introduction parts thereof. Further, the control section 28 retrieves the groups in the next layer.

With above described action, the introduction parts of a plurality of the groups of sentences (the retrieving units) in the audio file of the CD-ROM 12 can be reproduced as the voice, so the user can correctly retrieve the object group of sentences (STEP 106). Upon completing this action, the control section 28 returns to the STEP 102 to wait for the next command.

If the reading command is received, the control section 28 continuously retrieves the groups and reproduces the introduction parts of the retrieved groups, so the object group can be rapidly retrieved by simple key operation.

Besides the above described structure, retrieving one group and reproducing the introduction part of the retrieved group may be executed on the basis of each reading command. In this case, if another group should be retrieved, another reading command is inputted by the input section 18. In the case that a plurality of the reading commands are continuously inputted, the number of the commands is stored, then the retrieving and the reproduction are continuously executed a plurality of times, whose number is equal to that of the reading commands. With this structure, if the position of the object group is known, the object group can be correctly retrieved by inputting the reading command the necessary number of times.

Now, the reading action will be explained. In this explanation, the "paragraph" layer is designated as the retrieving layer, and the forward reading key is pushed. And the standard retrieving position is the beginning sector of the audio file of the CD-ROM 12.

The control section 28 designates that the retrieving layer is the paragraph layer on the basis of the command inputted. Then the control section 28 sequentially retrieves the paragraphs as the group of sentences from the beginning of the audio file when the forward reading key is pushed.

Firstly, the first chapter-the first paragraph-the first section is retrieved as the first retrieved group. The control section 28 reads the position of the starting sector of the first retrieved group and the message size thereof. For example, if the data of the starting sector is "2:00:00" (2 minutes-00 second-00 sector), and the size of the announce message (the introduction part) is "665" (665 bytes), the control section 28 reads 665 bytes of the writing data in the audio file from the starting sector "2:00:00" of the CD-ROM 12 and reproduces said data as the audio signals.

Secondly, the first chapter-the second paragraph-the first section is retrieved as the second retrieved group. The control section 28 reads the position of the starting sector of the second group and the message size thereof. If the data of the starting sector "22:15:45" (22 minutes-15 seconds-45 sector), and the size of the announce message is "939" (949 bytes), the control section 28 reads 939 bytes of the writing data in the audio file from the starting sector "22:15:45" of the CD-ROM 12 and reproduces said data as the audio signals.

Further, the control section 28 similarly and sequentially retrieves "the second chapter-the first paragraph-the first section", "the second chapter-the second paragraph-the first section", . . . , and the control section 28 reads the data of the retrieved groups and reproduces the same as the audio signals.

If the standard retrieving position is the present reading sector, the control section 28 retrieves in the designated direction from the present reading sector.

By designating the retrieving layer or class and retrieving the groups in the same layer, if the second chapter-first paragraph is the object group, the object group can be rapidly retrieved by skipping over sections.

When the backward reading key is pushed, the control section 28 sequentially retrieves the audio file toward the beginning of the file. While the retrieval, the control section 28 repeats to read and reproduce the data. For example, if the retrieving layer is the "section" layer and the standard retrieving position is the present sector, which is in the middle of "the second chapter-the first paragraph-the second section", the control section 28 sequentially retrieves "the second chapter-the first paragraph-the second section", "the second chapter-the first paragraph-the first section", "the first chapter-the second paragraph-the first section", . . . .

Next, the skip reading, in which the skip marks are assigned to specific groups and the control section 28 selectively reads the marked groups, will be explained.

If the marking key is pushed while the introduction part or the announce message of the present group is read, the control section 28 reads the position of the starting sector of the present group and the message size thereof from the retrieving table 14. Then the control section 28 writes said retrieving data in a skip table 30 of the memory section 20 (STEP 108). After STEP 108, the control section 28 goes back to STEP 102 to wait for the next command. Note that, data of the table of contents, which can designate the retrieving groups, may be employed instead of the positions of the starting sector.

When a plurality of skip marks are assigned, STEPs 102 and 108 are repeatedly executed, and the retrieved data of the marked groups are written in the skip table 30 in rotation as inputted.

To rapidly execute the skip reading function, the positions of the starting sectors in the skip table are arranged according to sector numbers. When the forward reading key or the backward reading key is pushed, the control section 28 reads the skip table 30 in the memory section 20, and sequentially reads the skip retrieving data (the positions of the starting sectors of the marked group and the message size thereof) in the designated skip direction (forward or backward). Then the control section 28 reads the written data of the introduction parts with the prescribed message size from the CD-ROM 12 using the reading section 16, and reproduces said data as a voice using the audio reproducing section 22. With above described operation, the skip reading can be executed (STEP 110). Afterwards, the control section 28 goes back to the STEP 102 to wait for the next command.

In the present invention, the data of the table of contents may be formed by the groups in the lowest level class or layer only, instead of the multilayered pyramidal data structure. The audio player of the present invention can be used to play audio books not only for blind persons, but also for ordinary persons.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An audio player for reproducing stored data as audio signals, the stored data being stored on a recording medium, the recording medium also storing a retrieving table, said stored data being classified into a plurality of sections, said retrieving table containing start addresses for each of said plurality of sections and introduction sizes for each of said plurality of sections, each introduction size defining an introduction part of the stored data within a given section, the introduction part of the stored data serving to introduce the entire data stored within the given section and being smaller in size than the entire data stored within the given section, said audio player comprising:

a reading section capable of reading said stored data and said retrieving table;

an audio reproducing section capable of converting read stored data into audio signals;

a memory section capable of storing said retrieving table;

an input section capable of accepting a user input command indicating a desired section of said plurality of sections; and a control section which accepts the user input command from said input section, determines a start address and introduction size of the desired section of said plurality of sections from said retrieving table, directs said reading section to begin reading said stored data beginning at the start address of the desired section, to read the stored data until the introduction size associated with the desired section has been read from the stored data, and then to stop reading the stored data.

2. The audio player according to claim 1, wherein said stored data represents text from a book and said retrieving table arranges said plurality of sections in a pyramidal data structure of different levels, with said sections forming paragraphs and said paragraphs forming chapters.

3. The audio player according to claim 2, wherein said input section is also capable of accepting a user input command indicating a retrieval direction, and wherein said control section causes said reading section to sequentially read an introduction part associated with a next section, paragraph, or chapter in the retrieving table in the retrieval direction.

4. The audio player according to claim 1, wherein said input section is also capable of accepting a user input command indicating a retrieval direction; and wherein said control section causes said reading section to sequentially read an introduction part associated with a next section in the retrieving table in the retrieval direction.

5. An audio player system for reproducing stored data as audio signals, the audio player system comprising:

a recording medium which has stored therein stored data and a retrieving table, said stored data being classified into a plurality of sections, said retrieving table containing start addresses for each of said plurality of sections and introduction sizes for each of said plurality of sections, each introduction size defining an introduction part of the stored data within a given section, the introduction part of the stored data serving to introduce the entire data stored within the given section and being smaller in size than the entire data stored within the given section; and an audio player which includes:

a reading section capable of reading said stored data and said retrieving table;

an audio reproducing section capable of converting read stored data into audio signals;

a memory section capable of storing said retrieving table;

an input section capable of accepting a user input command indicating a desired section of said plurality of sections; and a control section which accepts the user input command from said input section, determines a start address and introduction size of the desired section of said plurality of sections from said retrieving table, directs said reading section to begin reading said stored data beginning at the start address of the desired section, to read the stored data until the introduction size associated with the desired section has been read from the stored data, and then to stop reading the stored data.

6. The audio player system according to claim 5, wherein said stored data represents text from a book and said retrieving table arranges said plurality of sections in a pyramidal data structure of different levels, with said sections forming paragraphs and said paragraphs forming chapters.

7. The audio player system according to claim 6, wherein said input section is also capable of accepting a user input command indicating a retrieval direction, and wherein said control section causes said reading section to sequentially read an introduction part associated with a next section, paragraph, or chapter in the retrieving table in the retrieval direction.

8. The audio player system according to claim 5, wherein said input section is also capable of accepting a user input command indicating a retrieval direction; and wherein said control section causes said reading section to sequentially read an introduction part associated with a next section in the retrieving table in the retrieval direction.

* * * * *